Nov. 25, 1952　　　　　　G. C. LEWIS　　　　　　2,618,879
BOTTOMLESS BOX AND BALLOON TRAWL NET, INCLUDING FRONT
NETTING AND ADJUSTABLY CONNECTED TRAWL BOARD
Filed Nov. 27, 1950　　　　　　　　　　　　3 Sheets-Sheet 1

Guy C. Lewis
INVENTOR.

BY Clarence A. O'Brien
and Harvey B. Jackson
Attorneys

Nov. 25, 1952     G. C. LEWIS     2,618,879
BOTTOMLESS BOX AND BALLOON TRAWL NET, INCLUDING FRONT
NETTING AND ADJUSTABLY CONNECTED TRAWL BOARD
Filed Nov. 27, 1950     3 Sheets-Sheet 2

Guy C. Lewis
INVENTOR.

BY *Clarence A. O'Brien*
*and Harvey B. Jackson*
Attorneys

Nov. 25, 1952  G. C. LEWIS  2,618,879
BOTTOMLESS BOX AND BALLOON TRAWL NET, INCLUDING FRONT
NETTING AND ADJUSTABLY CONNECTED TRAWL BOARD
Filed Nov. 27, 1950  3 Sheets-Sheet 3
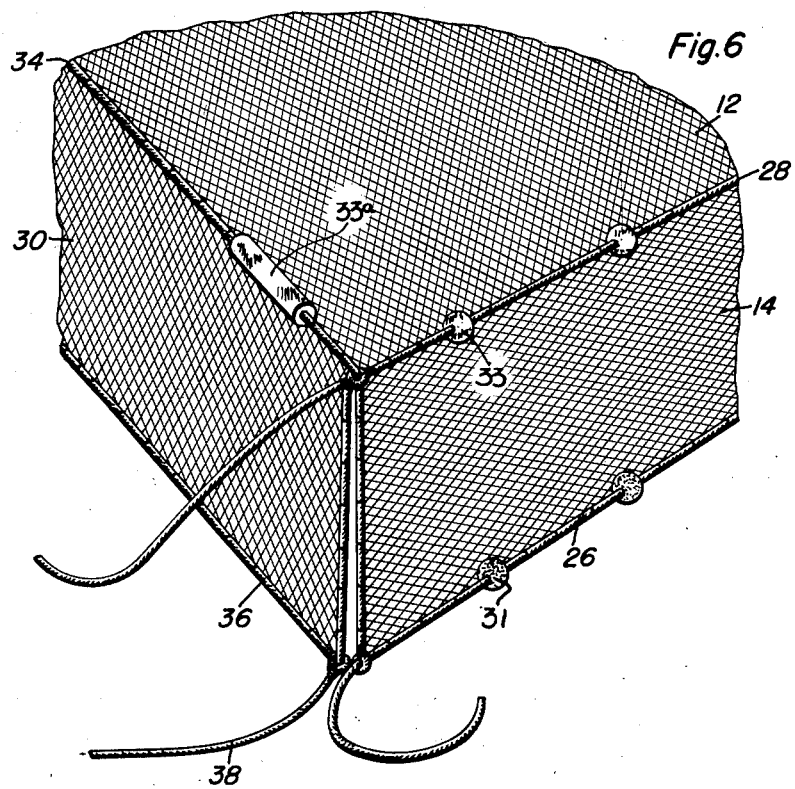
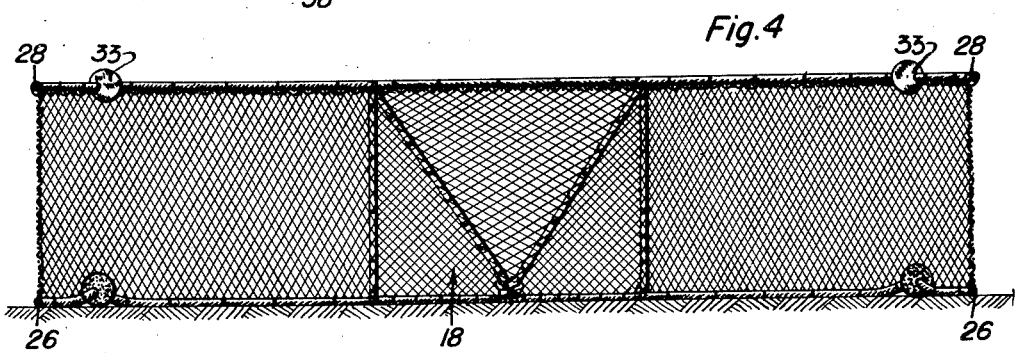
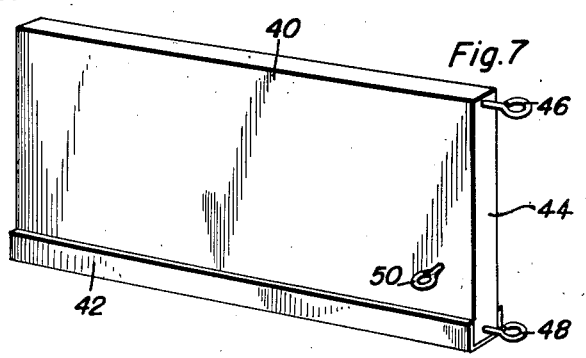
Guy C. Lewis
INVENTOR.

Patented Nov. 25, 1952

2,618,879

UNITED STATES PATENT OFFICE 2,618,879

BOTTOMLESS BOX AND BALLOON TRAWL NET, INCLUDING FRONT NETTING AND ADJUSTABLY CONNECTED TRAWL BOARD

Guy C. Lewis, New Orleans, La.

Application November 27, 1950, Serial No. 197,668

1 Claim. (Cl. 43—9)

This invention relates to new and useful improvements in shrimp-trawling devices and the primary object of the present invention is to provide a trawl net that is so constructed as to permit the same to be employed as a box or balloon trawl net for shrimp or fish.

Another very important object of the present invention is to provide a bottomless box and balloon net having a front netting at its mouth that will prevent relatively large shrimp from passing therethrough so that as the ground chain of the trawl gear, behind the front netting, contacts the shrimp they will be restricted from passing through the front netting although the mesh of the netting will permit small and young shrimp to escape from the net.

Yet another object of the present invention is to provide a net of the aforementioned character wherein the front netting will permit one-third to one-half more shrimp to be caught than was heretofore possible with a net of the same size lacking the front netting.

Another object of the present invention is to provide a bottomless box and balloon net whose mouth supports a front netting that will prevent the escape of relatively large shrimp and which will increase day shrimp trawling in clear water such as the Gulf of Mexico.

Another object of the present invention is to provide a trawling gear that will increase the net haul to a maximum and which will reduce to a minimum the maintenance of trawl gear to the benefit of boat owners.

A further object of the present invention is to provide a bottomless box and balloon net including a pair of adjustably connected trawl boards at the mouth of the net whereby the mouth of the net may be varied as to height and width depending upon the depth of water in which the same is pulled.

A still further aim of the present invention is to provide a shrimp trawl gear of the aforementioned character including a pair of side walls of uniform width throughout their length whose rear ends are attached to a rear pocket and reinforcing cables extending throughout the length of the side walls and supporting weights and corks in accordance with the depth of water in which the gear is disposed.

Other objects and advantages reside in the details of construction and operation as more fully hereinafter described and claimed, reference being had to the accompanying drawings forming part hereof, wherein like numerals refer to like parts throughout, and in which:

Figure 4 is an enlarged transverse vertical sectional view taken substantially on the plane of section line 4—4 of Figure 1;

Figure 5 is an enlarged transverse vertical sectional view taken substantially on the plane of section line 5—5 of Figure 1;

Figure 6 is a perspective view of one front corner of the trawl net and showing the front flap or netting lowered;

Figure 7 is a perspective view of one of the trawl boards used in the present invention; and, Figure 8 is an enlarged fragmentary top plan view of rear pocket of the trawl net and showing the pocket open.

Figure 1:
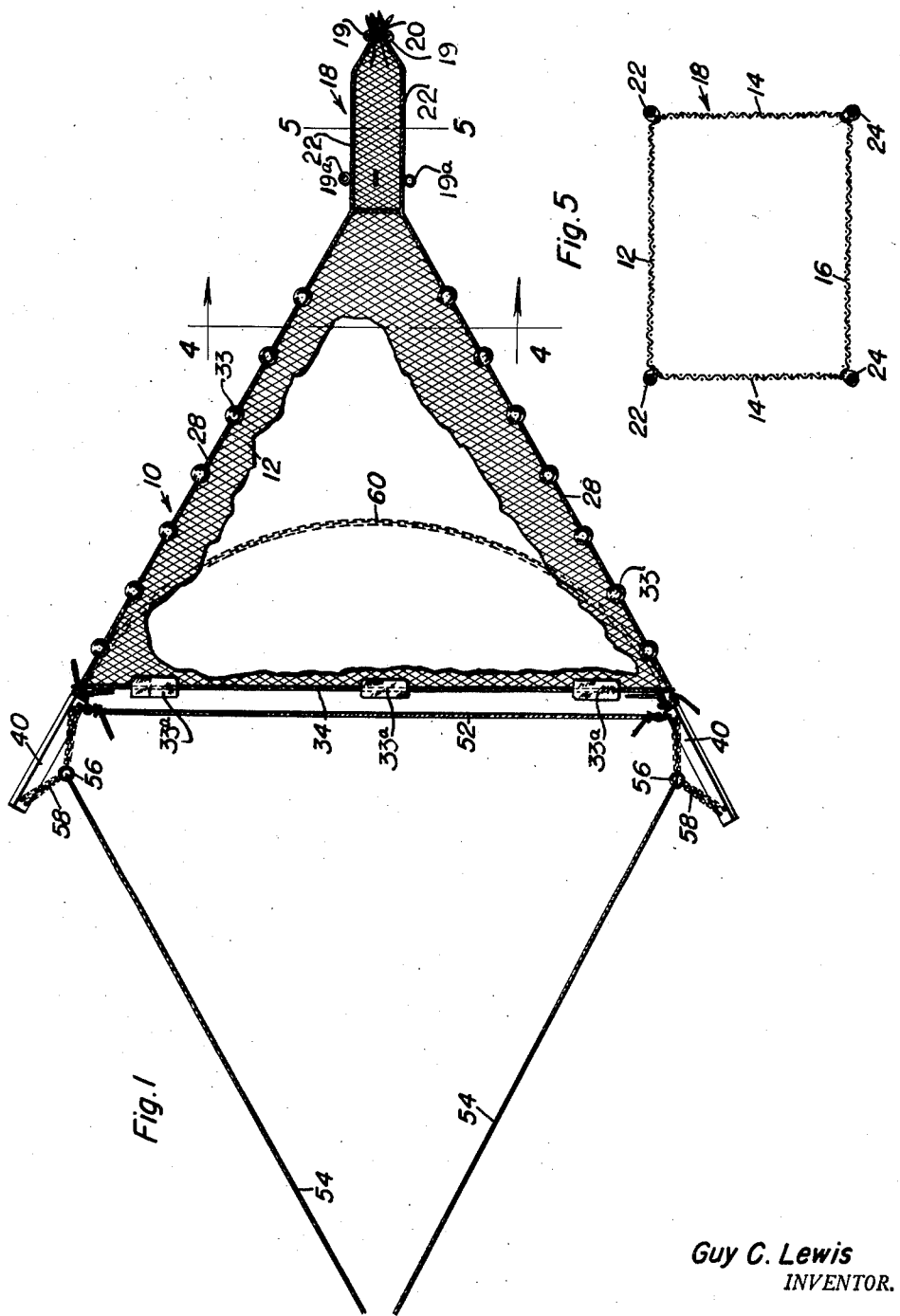
Figure 1 is a plan view of the present trawl gear and with parts of the upper wall or covering of the bottomless net broken away.

Referring now to the drawings in detail, wherein for the purpose of illustration, there is disclosed a preferred embodiment of the present invention, the numeral 10 represents a bottomless, combination box and balloon net having a rearwardly and inwardly tapering upper wall or covering 12 and a pair of rearwardly converging side walls or curtains 14.

The rear ends of the side walls 14 and the rear end of the upper wall 12 are joined and a bottom wall 16 is joined with the lower rear ends of the side walls to form a rear pocket 18 that is normally held closed by a releasable means, such as a tie cable 20 that extends through eyes 19 suitably attached to the pocket, as well known in the prior art. The forward portion of pocket 18 has additional eyes 19a suitably attached thereto which are adapted to form attaching means for cables (not shown) that may be employed for lifting the pocket.

Upper reinforcing cables 22 join the upper rear edges of the side walls 14 to the rear side edges of the upper wall 12 and an additional pair of lower reinforcing cables 24 join the side edges of the bottom wall 16 with the lower rear edges of the side walls 14. The side walls 14 are uniform in height throughout their length whereby the device will constitute a box net, later to be more fully described.

The lower edges of the side walls 14 support longitudinal reinforcing cables 26 and the upper edges of the side walls are joined with the side edges of the upper wall 12 by further reinforcing cables 28. The cables 26 and 28 extend from the mouth or forward end of the net to the pocket and form portions of cables 22, 24. The cables 26 and 28 support leads 31 and corks 33, respectively, to retain the side walls extended.

A front netting or flap 30 is attached at its upper edge to a transverse cork-supporting cable 34 secured to the forward edge of the upper wall 12 and the forward ends of the side walls 14, as shown best in Figure 6 of the drawings and carries suitable corks 33a. The marginal edges of the netting 30 are reinforced by cables 36 and the lower corners of the netting 30 support tie cables 38.

A pair of trawl-boards or side wings 40 form part of the trawling gear and these boards are substantially rectangular and have their lower edges suitably fixed in channels 42. The rear edges 44 of the boards 40 support upper and lower anchoring eyes 46 and 48. Additional anchoring eyes 50 project laterally from the rear ends of the boards 40 adjacent the lower edges thereof.

The forward ends of the cables 26 extend forwardly of the side walls 14 and are anchored or tied to the lower eyes 48 of the trawl boards 40. The forwardly extending ends of the upper cables 28 are tied to the upper eyes 46 of the trawl boards 40. The trawl-boards 40 are adjustably connected through the medium of a stay line or cable 52 whose ends are tied to the anchoring eyes 50 whereby the trawl-boards will be spaced apart a predetermined distance to vary the height and width of the net mouth as the gear is pulled through the water.

Means is provided for attaching the trawl-boards to a towing boat or boats and this means consists of two tow lines 54 whose rear ends support rings 56. The rings 56 are secured to the boards 40 by chains 58.

The use of trawl-boards, such as 40, with trawl gear is well known and the trawl-boards slope downwardly and inwardly as well as rearwardly and inwardly so that as the gear is pulled through the water the trawl-boards will be urged apart and against the water's bottom. Since the cable 52 is adjustably secured to the trawl-boards 40, a predetermined slack will be provided in the cable 34 permitting arching of the net mouth as the net is pulled through the water.

Figure 2:
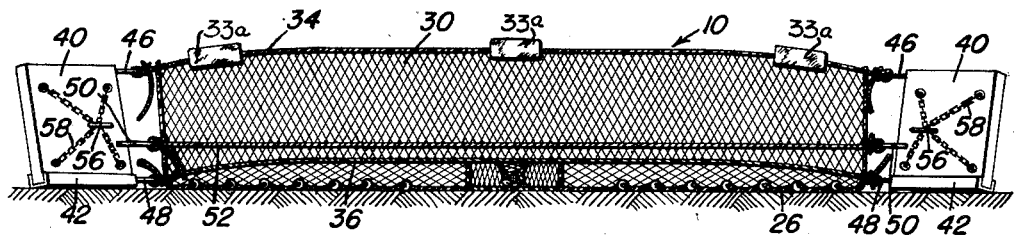
Figure 2 is a front elevational view of Figure 1 and showing the front netting lowered and very little arch to the net mouth.

The tie cables 38 are tied to the forward ends of the cables 26 or to the anchoring eyes 48 to retain the netting 30 lowered. The netting 30 and the side walls or curtains 14 are equal in height to the height of the trawl-boards to permit the net to be retained in the form of a box net for shrimp trawling as shown in Figure 2 of the drawings.

Figure 3:
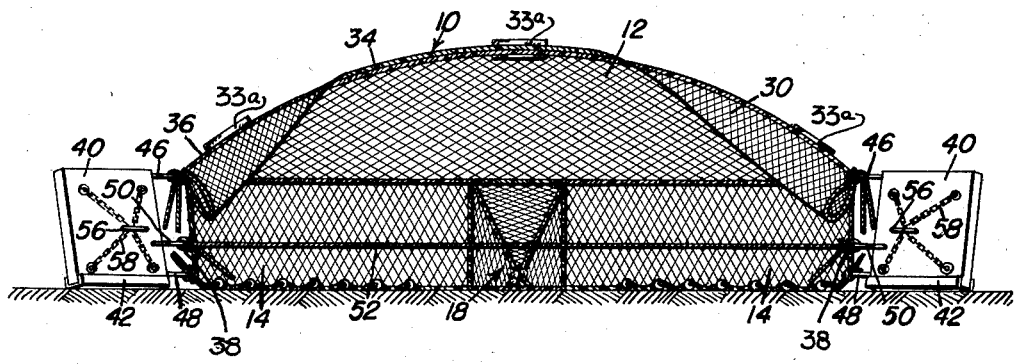
Figure 3 is a view similar to Figure 1 but showing the front netting raised and the trawl board connecting cable adjusted to permit the height of the net mouth to be increased to the arch shown in this view.
Figure 8:
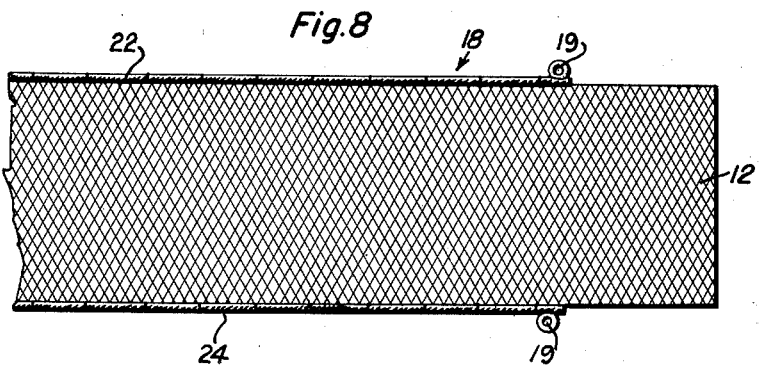

When trawling for fish, the distance between the trawl-boards 40 is reduced so that the forward end of the net and more specifically the upper wall 12 will arch as shown in Figure 3, and the netting 30 is raised and tied to the net.

The ends of a ground chain 60 are secured to the lower anchoring eyes 48 and the chain 60 extends rearwardly past the front netting 30 and is located between the side walls 14.

In practical use of the present gear as a box-net, the front netting or drop net 30 is lowered and the trawl-boards spaced apart substantially the length of the cable 34. As the gear is drawn by a boat or boats, the netting 30 will pass over the shrimp and the ground chain 60 will contact the shrimp whereupon the shrimp will tend to swim forwardly past the mouth of the net. However, the front netting 30 will prevent the shrimp from escaping and the shrimp will eventually enter the rear pocket or bag 18.

The front netting will permit the net to trap between one-third to one-half more shrimp than was heretofore possible with shrimp nets void of the front netting. Furthermore, the mesh of the front netting is such as to permit small or young shrimp to escape and to prevent certain species of fish from entering the net.

The net 10 will have twenty-five per cent stretch, tending to keep the side wings or trawl-boards pulled down to bottom instead of lifting them from the bottom. The sides of the net are leaded in accordance with the depth of the water and the mesh of the net varies with the size shrimp to be trapped. Since the side walls are of uniform height throughout their length, the cables 26 will remain lowered against the water bottom.

For use of the gear as a fish trawling device, the boards 40 are adjusted toward each other, see Figure 3, to permit arching of the net mouth and the netting 30 is raised.

The advantages of a bottomless balloon net are well known to those skilled in this art. However, this invention provides not only a bottomless balloon net but also a bottomless box net due to the adjustable connection between the boards 40. Also, the addition of the front netting to the box and balloon net is another outstanding feature of the present trawl gear.

Having described the invention, what is claimed as new is:

In a trawling gear, a bottomless box and balloon net having an upper wall, a rear pocket and a pair of rearwardly converging side walls connected to the rear pocket, a pair of trawl-boards, a cable attached to the forward ends of said side walls and the forward end of said upper wall, said cable being attached to said trawl-boards, a lower cable joined to the lower adjacent ends of the trawl-boards and the lower boundaries of the net wall and provided with weights spaced at short intervals throughout the length of the cable for causing the bottom of the side walls to assume a contour corresponding to the contour of the surface over which the side walls of the net rides, a connecting cable extending between and adjustably secured to the trawl-boards to vary the distance between the trawl-boards and permit the forward end of the net to be spread to a predetermined height and width, an elongated front netting terminally attached to the forward ends of said side walls and attached at its upper portion to the first named cable to prevent the escape of shrimp over which the front netting passes, and a ground chain terminally attached to said trawl-boards and extending between said side walls rearwardly of said front netting, said ground chain being connected directly to the adjacent ends of a trawl-board and having the entire portion thereof between the trawl-boards confined at the rear of the front netting and between the side walls, the ground chain being adapted to disturb shrimp to cause movement thereof, and the side walls due to their close contact with the ground confining the shrimp in movement at all times in the limits of the net structure thereby facilitating movement of the shrimp toward the rear pocket for trapping therein.

GUY C. LEWIS.

REFERENCES CITED

The following references are of record in the file of this patent:

UNITED STATES PATENTS

| Number | Name | Date |
|---|---|---|
| 1,103,173 | Cheting | July 14, 1914 |
| 1,548,413 | De Voogt et al. | Aug. 4, 1925 |
| 1,600,839 | Mudge | Sept. 21, 1926 |
| 1,692,830 | Hansen et al. | Nov. 27, 1928 |
| 1,745,251 | Enright | Jan. 28, 1930 |
| 2,414,055 | Miller | Jan. 7, 1947 |
| 2,511,057 | Guthrie et al. | June 13, 1950 |

FOREIGN PATENTS

| Number | Country | Date |
|---|---|---|
| 20,323 | Great Britain | 1894 |
| 45,624 | France | Nov. 2, 1935 |